United States Patent
Schug et al.

(10) Patent No.: US 11,795,010 B2
(45) Date of Patent: Oct. 24, 2023

(54) TRANSPORT DEVICE AND METHOD FOR TRANSPORTING CONTAINERS IN A MANNER REVOLVING ABOUT A VERTICAL MACHINE AXIS

(71) Applicant: KHS GmbH, Dortmund (DE)

(72) Inventors: Nils Schug, Riesweiler (DE); Andreas Fahldieck, Idar-Oberstein (DE); Uwe Wolf, Rüdesheim (DE)

(73) Assignee: KHS GmbH, Dortmund (DE)

( * ) Notice: Subject to any disclaimer, the term of this patent is extended or adjusted under 35 U.S.C. 154(b) by 282 days.

(21) Appl. No.: 17/426,421

(22) PCT Filed: Feb. 12, 2020

(86) PCT No.: PCT/EP2020/053662
§ 371 (c)(1),
(2) Date: Jul. 28, 2021

(87) PCT Pub. No.: WO2020/182402
PCT Pub. Date: Sep. 17, 2020

(65) Prior Publication Data
US 2022/0106131 A1    Apr. 7, 2022

(30) Foreign Application Priority Data
Mar. 11, 2019  (DE) .................. 102019106075.3

(51) Int. Cl.
*B65G 47/84* (2006.01)
*B65G 47/86* (2006.01)
*B65G 47/52* (2006.01)

(52) U.S. Cl.
CPC ......... *B65G 47/847* (2013.01); *B65G 47/525* (2013.01); *B65G 2201/0244* (2013.01)

(58) Field of Classification Search
CPC .... B65G 47/84; B65G 47/847; B65G 47/525; B65G 2201/0244
(Continued)

(56) References Cited

U.S. PATENT DOCUMENTS 3,628,451 A * 12/1971 McClellan ............. B21D 51/26
198/377.04
6,848,564 B2 * 2/2005 Nickey ............... G01N 21/9009
198/803.11
(Continued)

FOREIGN PATENT DOCUMENTS

CN     104540755 A     4/2015
DE     102006023531 A1   11/2007
(Continued)

OTHER PUBLICATIONS

International Search Report, PCT Application No. PCT/EP2020/053662 dated Jun. 5, 2020 (4 pages).

*Primary Examiner* — Leslie A Nicholson, III
(74) *Attorney, Agent, or Firm* — Occhiuti & Rohlicek LLP (57) ABSTRACT

A container-transport machine that selectively ejects container includes a transporter that is movable relative to a base and grippers arranged at the transporter. Each gripper suspends a container that is to be transported. An actuator is arranged at the base so as to be stationary relative to the transporter. The actuator is disposed at an ejection position for participating in selectively ejecting an individual container. A selectively-actuatable air nozzle disposed on the base at the ejection position promotes ejection of a container when an opening lever of a gripper interacts with the actuator while the opening lever passes through an ejection position.

20 Claims, 6 Drawing Sheets

(58) Field of Classification Search
USPC .................................... 198/377.04, 377.08
See application file for complete search history.

(56) References Cited

U.S. PATENT DOCUMENTS

| | | | |
|---|---|---|---|
| 7,220,932 B2* | 5/2007 | Monti | B65G 47/848 |
| | | | 198/441 |
| 7,398,871 B1 | 7/2008 | Basgil et al. | |
| 7,568,573 B2* | 8/2009 | Schill | B65G 47/5154 |
| | | | 198/482.1 |
| 9,302,856 B2* | 4/2016 | Papsdorf | B65G 47/846 |
| 9,371,195 B2* | 6/2016 | Papsdorf | B65G 47/846 |
| 9,517,898 B2* | 12/2016 | Fahldieck | B65G 47/847 |
| 10,259,665 B2* | 4/2019 | Fahldieck | B65G 47/847 |
| 11,345,626 B1* | 5/2022 | Scardino | B65B 21/18 |
| 2015/0151918 A1 | 6/2015 | Mader | |
| 2017/0096320 A1 | 4/2017 | Zoni et al. | |

FOREIGN PATENT DOCUMENTS

| | | | | |
|---|---|---|---|---|
| DE | 102015000631 A1 | 7/2016 | | |
| EP | 0647578 A1 | 4/1995 | | |
| EP | 2604553 A1 | 6/2013 | | |
| JP | 2011063331 A | 3/2011 | | |
| JP | 2015125017 A | 7/2015 | | |
| WO | 2013064198 A1 | 5/2013 | | |
| WO | 2018103933 A1 | 6/2018 | | |
| WO | 2018197068 A1 | 11/2018 | | |
| WO | WO-2019048622 A1 * | 3/2019 | ......... G01N 21/9009 | |

* cited by examiner

TRANSPORT DEVICE AND METHOD FOR TRANSPORTING CONTAINERS IN A MANNER REVOLVING ABOUT A VERTICAL MACHINE AXIS

RELATED APPLICATIONS

This is the national stage of international application PCT/EP2020/053662, filed on Feb. 12, 2020, which claims the benefit of the Mar. 11, 2019 priority date of German application DE 102019106075.3, the content of which is incorporated herein by reference.

FIELD OF INVENTION

The invention relates to selectively ejecting containers from a container-handling machine.

BACKGROUND

In container processing, there are times when a defective container is identified. Such a container must be ejected. However, the production speed of known container-processing machines is high, for example greater than 80,000 bottles per hour. It is therefore important for ejection to take place quickly. It is also important to avoid inadvertently ejecting or damaging containers near the container that is to be ejected.

Known container-processing machines that operate at such high speeds are able to eject streams of containers. However, this differs from ejecting a single container.

SUMMARY

The invention is based on the object of providing a transport device and a corresponding method that selectively eject containers in a particularly reliable and precise manner without affecting other containers that are also being transported.

The transport device is one that transports containers along a circular path around a vertical machine axis. The device comprises a fixed position base and a transporter that can be rotated and/or displaced in relation to the base. Grippers are arranged on the transport unit. Each gripper suspends a container to be transported. An actuator is disposed at a fixed position on the base in the region of an ejection position along the transport path of the containers. This actuator participates in selectively ejecting individual containers. The gripper comprises an opening lever. An interaction between the actuator and the lever at least partially opens the gripper while in an angular range encompassing the ejection position. A selectively actuatable nozzle arranged in the ejection position on the base provides an air blast that assists in ejecting a container from the at least partially opened gripper.

A method according to the invention for transporting containers in a manner revolving about a vertical machine axis comprises transporting a container held in a gripper of the transport device as far as an ejection position. In the region of the ejection position, the gripper is guided past an actuator, which is arranged on a fixed base. The actuator optionally interacts with an opening lever of the gripper to partially open the gripper so that a blast of air from an air nozzle is able to eject the container.

Such a configuration of the transport device promotes a more reliable and precise ejection of a single selected container from one of the grippers of the transport device without disturbing the transport of other containers. In particular, the use of an air blast or air jet to selectively eject a container that is being gripped by a partially-open gripper provides a simple way to select an individual container even at very high transport speeds or at high transport rates. In particular, such a method is useful when operating at a transport rate of over 80,000 containers per hour.

The transport device is any device that individually transports containers, and in particular, a large number of identical containers along a circular path that defines a plane perpendicular to a machine axis. In those cases in which the transport device is on horizontal ground, the machine axis is vertical. Embodiments include those in which the transport device is part of a larger system for producing or filling containers. Among the embodiments are those in which the transport device includes a star, such as a transport star or a gripper star.

Although the transport device can transport the containers in any desired position, it is preferable to transport the containers that are standing or otherwise held upright, for example by suspending the containers.

In some embodiments, a portion of the suspended container's weight is carried by other means. For example, it is conceivable for the container being transported to be both suspended and supported on its side or underside in order to prevent containers being transported from oscillating or shaking.

Among these embodiments are those in which the container's base or underside contacts a stop that extends in a radial direction.

In some embodiments, the transport device is configured for exclusively suspended transport of the containers.

In preferred embodiments, each container to be transported to be held exclusively by one single gripper and/or to have no contact with other parts of the transport device. In some embodiments, the containers are held at a neck ring or a ring-shaped region beneath a screw opening during transport by means of the gripper. This is particularly useful when the container is a bottle.

As used herein, "container" refers to any article for the at least partial enclosing of goods, wherein the containers are provided preferably for the packing of foodstuffs, in particular for beverages or liquid foodstuffs. Containers include bottles, cans, or the like. The containers are formed from any desired material and/or from any desired number of parts. In a preferred embodiment, the containers are formed at least partially or entirely from plastic, in particular PET and/or polyethylene. It is also preferable for containers to be those that are suitable for mass production and/or mass processing, in particular with a transport rate of at least 50,000 containers per hour or at least 80,000 containers per hour.

As used herein, ejection of a container refers to a process in which a container is removed from the transport device at a predetermined position. Embodiments include non-guided and guided ejections. A non-guided ejection includes removal from the transport device in a way that does not guide the path of the container after removal. Examples include those in which the container simply falls and those in which it is flung away by centrifugal force. In a guided ejection, the container is removed along a defined path out of the transport star.

References to "selective ejection" refer to ejecting a predetermined container in a specific manner from the production or treatment process during the transport by the transport device. As a result, there is no random movement of the transport path that takes place in order to deflect a larger number of non-specific containers. Instead, individual containers that have been selected beforehand are ejected one at a time. Among the embodiments are those in which such selection is carried out by an optical detection of defects and/or contamination.

The fixed-position base is that part of the transport device that secures the transport device at the installation location and/or in the installation position immovably in relation to the surface below it. In some embodiments, the base is a stand or frame. In alternative embodiments, the base comprises further functional units and/or modules that carry out various tasks associated with manufacturing or treating containers. In still other embodiments, the base is part of a larger system into which the transport device is integrated.

The rotatable and/or displaceable transport unit is that part of the transport device by means of which the containers to be transported are moved through the transport area. Embodiments include those in which the entire transport unit moves as one entity, as is the case with the transport star. Other embodiments include those in which it is formed from movable parts that are movable in relation to one another. In such embodiments, one of the functions of the transport units is to take up the grippers for the transport of a container in each case and preferably to secure them so as to be movable in relation to the base.

As used herein, "gripper" refers to a device that holds an individual container in either a non-positive or positive fit. In some embodiments, the gripper comprises two gripper arms, of which one or both can be moved in relation to the other to thereby hold a container. Such a gripper transitions between an opened position for taking up a container and a closed position for holding a container. In a preferred embodiment, the gripper is subjected to preliminary tension, preferably by a spring, that urges the gripper towards its closed position. In some embodiments, all grippers of the transport device are indistinguishable from one another and are distributed on the transport unit preferably at the same distance from one another and/or uniformly over the length or circumference respectively.

The ejection position is that position along the course of the transport device at which the containers to be ejected are specifically removed from the transport device. In some embodiments, the ejection position is a point along the movement path of the containers in the transport device. In other embodiments, in particular with transport devices with high transport rates and transport speeds, the ejection position occupies a short portion of the track along which containers travel when transported by the transport device. In those cases where the transport device is a star, the track is a portion of a circular path. Preferably, the track portion is preferably no longer than the diameter of three containers. In some embodiments, the track's length is the distance between adjacent grippers.

The actuator can in principle be formed as an individual component or module, and in this situation is provided such as to be able to interact with the opening lever of the gripper, in order to be able to open the gripper at least intermittently and at least partially at the ejection position. For this purpose the actuator is arranged in a fixed position at the base, wherein it can be arranged either directly on the base or indirectly on the base by way of further components. In addition to this, a movable arrangement on the base is also possible, wherein a temporary fixed-position securing of the actuator can also be effected. The at least intermittent and at least partial opening of the gripper by means of the actuator is intended to allow for the ejection of the container from the gripper in the region of the ejection position. In this situation the gripper is opened sufficiently widely for the container to be released entirely from the gripper, i.e. the opening width of the gripper in this situation is greater than the diameter of the portion of the container held by the gripper. Preferred in relation to such an only partial opening of the gripper is an opening of the gripper with a still greater opening width is possible, in particular for taking up a container. The opening of the gripper by means of the actuator takes place preferably only intermittently, and as a maximum over the duration of the interaction of the actuator with the opening lever of the gripper. In some embodiments, the gripper is only opened for a part of the duration of the interaction of the actuator with the opening lever sufficiently far for a container located in the gripper is or can be ejected.

The opening lever is arranged as a part of the gripper or in a fixed position in relation to the gripper, in particular at the transport unit, and provided so as to open the gripper at least intermittently and at least partially when the opening lever interacts with the actuator. The interaction of the actuator with the opening lever of the gripper can be put into effect in this situation mechanically or in any other desired manner, and in particular also contactless, for example magnetically.

Preferably, both the actuator as well as the opening lever are always active and interact with one another accordingly.

In some embodiments, the gripper is opened widely enough so that the container is no longer held by the gripper. In such cases, the ejection of the container from the gripper takes place on its own and is only supported by the air jet from the air nozzle.

Other embodiments feature opening the gripper briefly so that a container that is not to be ejected is still able to be caught by closing the gripper before it can fall. In such cases, a container to be ejected is blown off by a blast of air during this brief interval between opening and closing the gripper.

As an alternative, however, the actuator and/or the opening lever of the gripper, or the entire gripper, can also be adjustable in such a way that an interaction effect of both components can be controlled, and, in particular, only takes place if chosen.

The selective ejection can also be achieved by having all the grippers be partially opened. In such cases, ejection is carried out only by controlling the nozzle, with no need to control the gripper.

In other embodiments, it is not possible to eject the container without also opening or partially opening the gripper.

The air nozzle can be any desired nozzle that is suitable for emitting a targeted air jet. Preferably, the air jet is formed and/or controlled in a way that results in an air blast or jet that can only eject containers from grippers that are at least partially opened. In other embodiments, an air blast or jet directed towards a container held by a closed gripper does not lead to an ejection of the container.

In a transport device formed as a transport star, the air nozzle is preferably directed radially onto the outside of the transport star. As an alternative or in addition to this, the air nozzle is preferably directed against a take-up direction of a container into the gripper or in the direction of the opening of the gripper to release the container being held.

A transport star defines a polar coordinate system having a radial and circumferential direction. In other embodiments, the nozzle blows air along a direction that makes an angle relative to the radial direction. Embodiments include those in which this angle is between zero and twenty-five degrees, those in which it is between zero and fifteen degrees, and those in which it is between zero and ten degrees in the transport direction of the containers or directed onto the containers being transported into the ejection position.

In still other embodiments, the air nozzle is activated only when a container that is to be ejected is located in front of the air nozzle. in such embodiments, the air nozzle remains inactive when a container that is to be transported onward, rather than ejected, is moved in front of the nozzle.

Additional embodiments include those in which the air nozzle is adjustable or movable, for example to accommodate containers of different sizes that are to be transported at differing speeds. Such embodiments include those in which the air nozzle's height is adjustable and those in which the nozzle is movable along the machine axis. As a result, the position on the container against which the air jet impinges can be adjusted up or down along the container's axis.

Some embodiments feature a rotatable air nozzle. Among these are embodiments in which the nozzle rotates in or against the transport direction of the containers. In some embodiments, adjustment of the air nozzle is carried out automatically, whereas in others, it is carried out by hand.

The gripper has an opening for receiving containers. In some embodiments, the actuator is arranged on a side of the gripper that is opposite this opening.

In other embodiments, for example in those that use a circular transport device, in particular a transport star, the actuator is arranged radially inwards in relation to the position of the grippers. This results in a structure that saves space and avoids interference with the interaction between the actuator and the opening lever.

In still other embodiments, the actuator can be raised or lowered along the direction of the transport star's axis of rotation.

In some embodiments, the gripper comprises two gripper arms, which can be pivoted towards one another in order to grip a container. In such embodiments, the opening lever is arranged on one or both gripper arms, and in this situation, in some embodiments, is arranged on a side of a pivot axis of the gripper arms which is opposite the region of the gripper for receiving the container. This results in a particularly simple structural design that promotes particularly reliable and fault-free gripper operation.

In some embodiments, the opening lever is formed as one piece with one of the gripper arms so that it is integral with the gripping arms. For further preference, the opening lever is arranged on the front or first gripper arm, in a transport direction of the transport device.

In other embodiments, the opening lever is arranged on the gripper arm in such a way that the movement of the gripper with the opening lever past the fixed-position stationary actuator leads to or can lead to the at least intermittent and at least partial opening of the gripper when the actuator is active. In some of these embodiments, the opening lever is arranged at the grippers of a transport star projecting radially inwards. Among these are embodiments in which the lever is inclined against the transport direction of the transport star.

In some embodiments, the actuator includes a roller. Among these are embodiments in which the actuator interacts directly or mechanically with the opening lever. This results in a particularly simple structure.

Among the embodiments that use a roller are those in which the roller rotates relative to the base. In some embodiments, the roller's rotation axis is parallel or coaxial with that of the transporter. Other embodiments include those in which the roller's rotation axis is perpendicular to the transporter's transport direction.

Among the embodiments that rely on a roller are those that rely on a one-piece roller, those that rely on a plastic roller, and those that rely on a rubber roller.

Other embodiments carry out contactless interaction between the actuator and the lever. Among these are embodiments in which the interaction is magnetic, for example using an electromagnet or a permanent magnet. The former permits electrical switching and the latter permits mechanical switching. Embodiments include those in which the lever has a portion that is made of a magnetic material or a material that is attracted to a magnet. Among the embodiments are those in which the actuator comprises an electromagnet and the opening lever comprises a permanent magnet. Such contactless interaction reduces mechanical loading that results from having the physically engage a lever.

In some embodiments, the air nozzle at the ejection position is arranged and/or aligned in such a way that an air jet produced by the air nozzle strikes the container that is to be ejected in such a way as not push the container along a direction that includes one or more of a radially outward component and a vertically downward component.

Among these embodiments are those in which the nozzle is aligned to cause the air jet to impinge the container's center of gravity, thereby ejecting the container without imparting significant rotation onto the container. Some embodiments include the nozzle to strike the container within a suitable distance from the center of gravity. In some examples, the angle is one that is inclined radially to the vertical machine axis by up to ten degrees.

Embodiments also include those that prevent a rotation along the height of the container held in the gripper by directing the air jet onto the bottle neck or onto a region adjacent to the gripper.

In other embodiments, the air nozzle is arranged above the center of gravity or in the middle of the container, and in some embodiments between the gripper and the center of gravity or the middle. As a result, the air jet coming from the nozzle leads to a rotation away from the gripper of the part of the container held by the gripper.

With one advantageous further embodiment of the transport device according to the invention, the air nozzle, and preferably the entire transport device for ejection is configured in such a way that a complete ejection of the container takes place in the ejection position in less than two hundred milliseconds, preferably less than one hundred milliseconds, in some embodiments less than fifty milliseconds, and for very particular preference in less than ten milliseconds, as a result of which an ejection of containers is possible even at high transport speeds and transport rates. For transport devices for the handling of containers, and in particular of empty plastic bottles, it is important that the process of ejection takes place very rapidly, since in these devices the containers are transported at a very high speed. In this situation it is entirely usual that per hour at least 60,000 containers, and in particular at least 80,000 containers are moved through the ejection position, such that the air nozzle must function very precisely and the air jet produced by means of the air nozzle must only be very short in order to remove precisely one container, specifically and selectively, and in this situation without influencing the preceding and following containers.

A further embodiment of the transport device according to the invention makes provision for an interaction of the actuator with the opening lever to take place only in the region of the ejection position and/or for the gripper to be opened in this situation sufficiently wide for the container which is to be ejected is ejected with a contact ring, securing ring, or neck ring lying on the gripper or sliding along it, such that the ejection of the container is supported by means of the air nozzle, as a result of which a particularly simple mechanical structure of the device is achieved, with few moving parts.

In order to be able to better control the selective opening, at least intermittent and at least partial, of the gripper in the ejection position, it is conceivable that the actuator is arranged on the base so as to be movable, in such a way that the actuator can be moved between an actuating position with an interaction effect of the actuator with the opening lever, and a transport position without mechanical or magnetic or other interaction effect of the actuator with the opening lever, as a result of which an interaction effect of the actuator with grippers with containers which are not to be ejected can be entirely avoided in a simple manner. This configuration of the invention is particularly preferred if the actuator is configured as a roller. The actuator is in some embodiments movable in the axial direction of the roller and/or coaxially to a rotation axis or machine axis of the transport means formed as a transport star, and/or movable in height, related to a standing placement position of the transport device, in particular movable in a linear manner. As an alternative or in addition, a movement is also conceivable radially to the roller and/or to an axis of rotation or machine axis of the transport means formed as a transport star. In order for the actuator to be moved rapidly between the actuating position and the transport position, it is arranged in some embodiments on a linear motor or a pneumatic cylinder.

According to one advantageous embodiment of the transport device according to the invention, the opening lever or the entire gripper can be moved between a transport position and an ejection position, wherein only in the ejection position is an interaction possible or takes place between the opening lever and the actuator. In this situation, preferably the entire gripper is arranged at the transport device, in particular at the transport star, at the height related to a standing placement position of the transport device and/or parallel or co-axially in relation to the axis of rotation of the transport star and/or at right angles to the transport direction of the transport device. In some embodiments, the gripper is lowered out of the transport position, which in some embodiments represents the starting or normal position, into the ejection position, in such a way that it is only in the outlet position that the opening lever moves into the region of the actuator. For further preference, the actuator is arranged in such a way that the opening lever, in the transport position, is transported away by means of the actuator, in particular free of any interaction effect.

With one preferred further embodiment of the transport device according to the invention, a further actuator is arranged in a region upstream of the ejection position, in order to displace a gripper from a transport position into an ejection position, wherein the further actuator is preferably a high-speed pusher, which in some embodiments in operated electromagnetically or pneumatically. The further actuator can in principle be any kind of actuator, which preferably allows for a linear displacement within the time span available, preferably in less than one hundred milliseconds, in some embodiments in less than fifty milliseconds, and for very particular preference in less than ten milliseconds. In some embodiments, the further actuator is arranged directly along the transport path of the gripper that is to be adjusted, and for very particular preference is arranged stationary and in a fixed position in relation to the base. For further preference, the further actuator comprises a pneumatic cylinder and/or an electromagnetically driver actuator and/or a linear motor.

Finally, it is advantageous if a resetting means is arranged along the transport path of the gripper behind the ejection position, in order to reset all the grippers in the ejection position into the transport position, wherein the resetting means is preferably formed as stationary and in a fixed position in relation to the control curve secured opposite the base. Preferably, the resetting takes place into the transport position, and in particular a raising of the grippers is carried out by means of resetting means formed as a control curve or cam. As an alternative, the resetting means can also be configured in its structure as identical with the further actuator. In some embodiments, a control curve or cam is provided as resetting means, which interacts with the opening lever of the gripper and displaces the gripper back into the transport position.

An exemplary embodiment of the transport device according to the invention is explained in greater detail hereinafter by reference to the drawings, in which:

DETAILED DESCRIPTION

Figure 1:
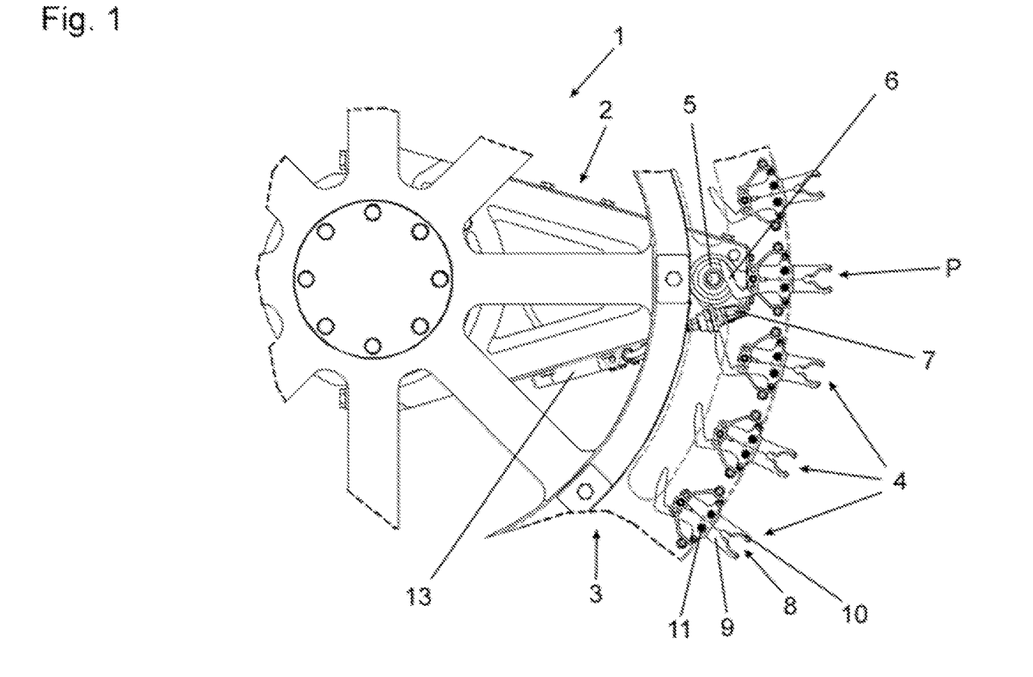
FIG. 1 shows an upper side of a portion of a transport device for transporting containers in a manner revolving about a vertical machine axis and for the selective ejection of containers in the region of an ejection position.

FIG. 1 shows a transporter 1 that selectively ejects defective bottles. The transport device include a base 2, a star 3, which rotates on the base 2 about a machine axis MA, and a plurality of identical grippers 4. The grippers 4 are disposed uniformly around the transporter's circumference for receiving containers, such as bottles.

Each gripper 4 has first and second arms 9, 10 that form an opening 8 therebetween for receiving a container. The arms 9, 10 are mounted to pivot about corresponding pivot axles 11. As a result, the arms 9, 10 pivot towards or away from each other between closed and open positions of the gripper 4. The gripper 4 is biased to remain in a closed position. As a result, the gripper 4 can hold a container without actively being actuated.

The gripper 4 participates in ejecting a previously-selected container from the transport device 1 by partially opening at an ejection position P along a transport path taken by the containers through the transporter 1. The container, which is at this point held by reduced force, is then easily ejected from the gripper 4 by a blast of air. The energy in the blast of air is selected to be great enough to eject a container from a partially-opened gripper 4 but not great enough to eject a container from a completely-closed gripper 4.

An actuator 5 is disposed on the base 2 in the region of the ejection position. The actuator 5, which is configured as a plastic roller, causes the gripper 4 to transition into a partially-opened position at the ejection position P.

The gripper 4 includes an opening lever 6 that is integral with the first gripper arm 9. The first gripper arm 9 is arranged opposite the gripper's opening 8 and extends at an angle relative to a line that connects the two pivot axes 11 of the gripper 4. As a result of this position and orientation, the actuator 5 interacts with the opening lever 6 as it is guided past the actuator 5, thereby partially-opening the gripper 4. In particular, the opening lever 6 is pressed as it is guided past the actuator 5.

The opening lever 6 extends along a direction that has a radially-inward direction as well as a circumferential direction. The direction is such that the radially-innermost end of the opening lever 6 is the trailing end based on the star's direction of rotation. As a result, the opening lever 6 is guided along the rolling actuator 5 so as to cause the gripper 4 to remain partially open for the duration of the lever's interaction with the actuator 5.

As can be seen in FIG. 1, an air nozzle 7 is arranged to emit a blast of air directed towards a container at the ejection position P so that it strikes the container while the gripper 4 is partially opened. A controller 13 selectively activates the air nozzle 7 in such a way that an individually-selected container can be ejected from the transport device 1 even while the transport device 1 is transporting as many as 80,000 containers per hour.

Figure 2:
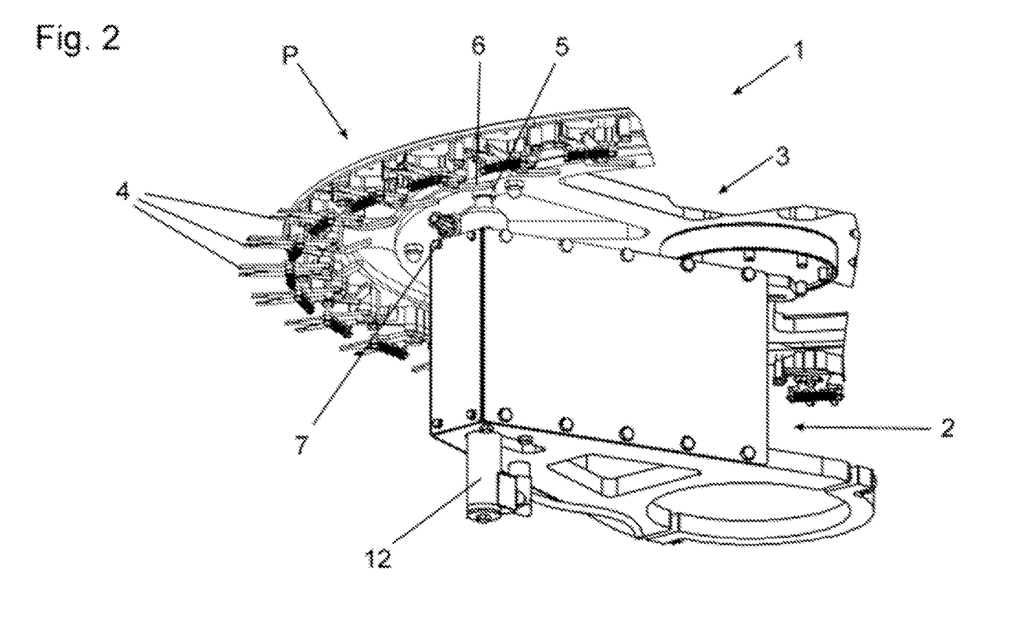
FIG. 2 shows a perspective part view of the transport device represented in FIG. 1 for the selective ejection of containers.
Figure 3:
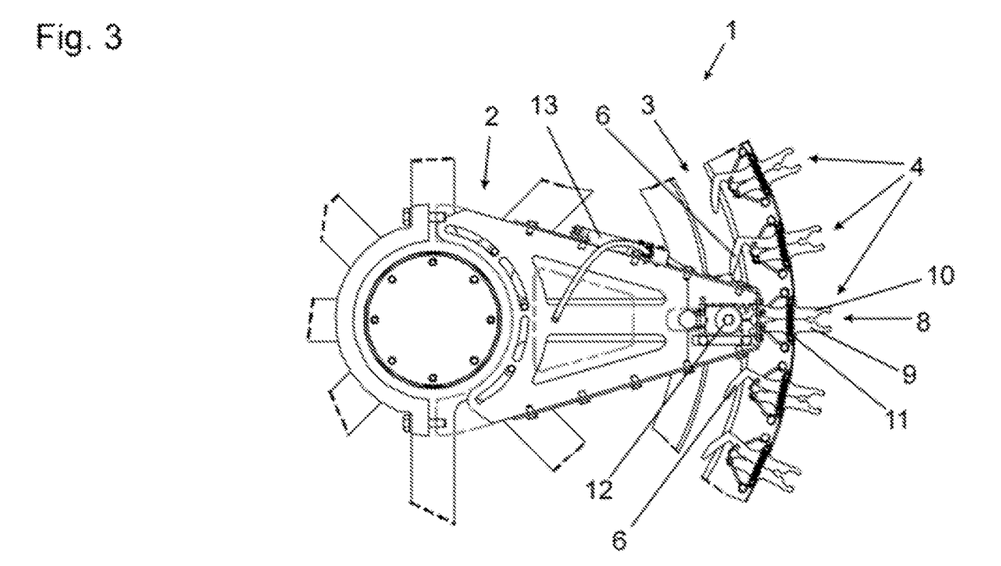
FIG. 3 shows a view of the underside of the portion of the transport device represented in FIG. 1.
Figure 4:
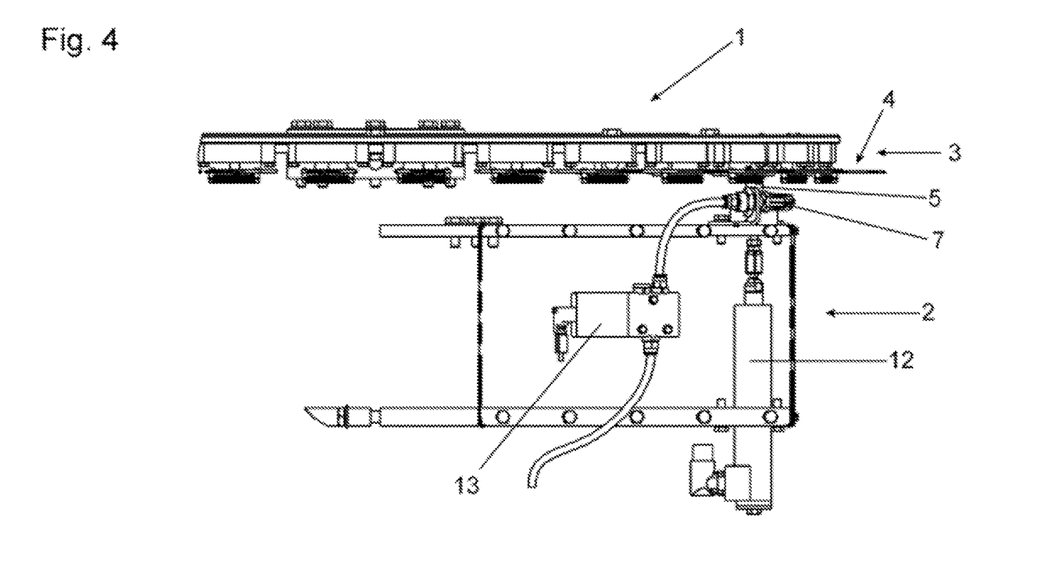
FIG. 4 shows a side view of the portion of the transport device represented in FIG. 1.
Figure 5:
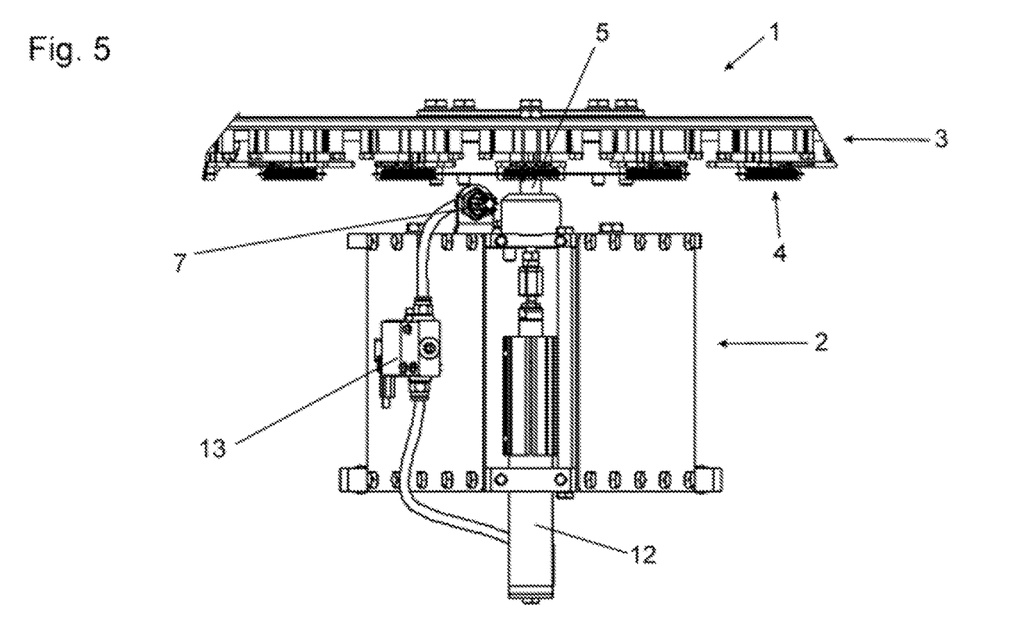
FIG. 5 shows a front view of the portion of the transport device represented in FIG. 1.
Figure 6:
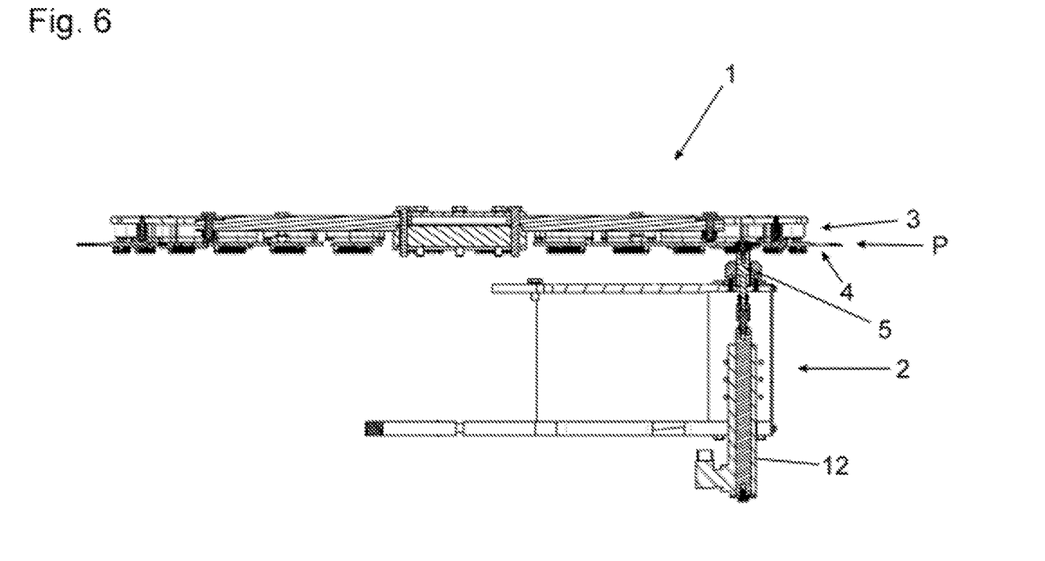
FIG. 6 shows a side section view of the portion of the transport device represented in FIG. 1.

In some embodiments, the actuator 5 is one that is configured to be lowered sufficiently to avoid mechanically interacting with the opening lever 6. As shown in FIG. 2, a linear drive 12 in the base 2 is secured to the actuator 5 so as to displace the actuator 5 axially along the direction of the transporter's machine axis MA.

Having described the invention and a preferred embodiment thereof, what is claimed as new and secured by letters patent is:

The invention claimed is:

1. An apparatus comprising a container-transport machine that selectively ejects a defective container, said container-transport machine comprising
   a base,
   a transporter,
   grippers,
   an actuator, and
   a nozzle,
   wherein said base is stationary,
   wherein said transporter is movable relative to said base,
   wherein said grippers are arranged at said transporter,
   wherein one of said grippers suspends said container during transport thereof,
   wherein each of said grippers comprises an opening lever that interacts with said actuator while said opening lever passes through an ejection position,
   wherein said actuator is arranged at said base to be stationary relative to said transporter,
   wherein said actuator is disposed at said ejection position for participating in selectively ejecting an individual container,
   wherein said nozzle is disposed on said base at said ejection position, and
   wherein said nozzle is selectively actuatable to promote discharge of said container.

2. The apparatus of claim 1, wherein said actuator is arranged opposite an opening in said gripper and radially-inward relative to said gripper.

3. The apparatus of claim 1, wherein said gripper comprises first and second gripper arms that pivot towards each other to grip said container, wherein said opening lever is arranged on said first gripper arm on a side of a pivot axis of said first gripper arm that is opposite an opening in which said gripper receives said container.

4. The apparatus of claim 1, wherein said actuator magnetically interacts with said opening lever in a contactless manner.

5. The apparatus of claim 1, wherein said actuator interacts with said opening lever using a current- generated magnetic field.

6. The apparatus of claim 1, wherein said nozzle is configured to direct an air jet to impact said container, wherein said air jet applies a force that moves said container radially outward.

7. The apparatus of claim 1, wherein said nozzle is configured to direct an air jet to impact said container, wherein said air jet applies a force that moves said container radially outward and vertically downward.

8. The apparatus of claim 1, wherein said nozzle is configured to direct an air jet to impact said container, wherein said air jet applies a force that moves said container vertically downward.

9. The apparatus of claim 1, wherein said nozzle is configured to direct a jet of air to impact said container, wherein said jet impacts a surface of said container to exert a force directed at a non-zero angle that is up to ten degrees relative to a transport direction in which said container is transported.

10. The apparatus of claim 1, wherein said nozzle is configured to cause said container to be completely ejected in less than a hundred milliseconds.

11. The apparatus of claim 1, wherein said actuator is movable relative to said base between an actuating position and a transport position, wherein, in said actuating position, said actuator is disposed to interact with said lever, and wherein, in said transport position, said actuator is disposed to inhibit interaction with said lever.

12. The apparatus of claim 1, wherein said actuator comprises a roller that interacts mechanically with said lever.

13. The apparatus of claim 1, wherein said actuator magnetically interacts with said opening lever in a contactless manner and wherein said actuator is mechanically switchable.

14. The apparatus of claim 1, wherein said actuator magnetically interacts with said opening lever in a contactless manner and wherein said actuator is electrically switchable.

15. The apparatus of claim 1, wherein said nozzle is disposed such that an air jet impinging on said container avoids imparting rotation to said container during ejection thereof.

16. The apparatus of claim 1, wherein said nozzle is disposed such that an air jet impinging on said container at said container's center of gravity.

17. The apparatus of claim 1, wherein said interaction between said lever and said actuator is one that avoids mechanical loading.

18. The apparatus of claim 1, wherein said interaction between said lever and said actuator is one that causes mechanical loading.

19. The apparatus of claim 1, wherein said gripper is configured to suspend said container from a neck ring thereof.

20. The apparatus of claim 1, further comprising a linear drive at said base, said linear drive being secured to said actuator for causing said actuator to move axially between a position at which said actuator interacts with said lever and a position at which said actuator avoids interaction with said lever.

\* \* \* \* \*